(12) United States Patent
Peng

(10) Patent No.: US 9,104,039 B2
(45) Date of Patent: Aug. 11, 2015

(54) METHODS AND SYSTEMS FOR PERFORMING VISION-AIDED PASSIVE ALIGNMENT DURING THE ASSEMBLY OF AN OPTICAL COMMUNICATIONS MODULE

(75) Inventor: Goh Han Peng, Singapore (SG)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 617 days.

(21) Appl. No.: 13/466,162

(22) Filed: May 8, 2012

(65) Prior Publication Data

US 2013/0300858 A1     Nov. 14, 2013

(51) Int. Cl.
*H04N 7/18* (2006.01)
*G02B 27/62* (2006.01)
*G02B 7/00* (2006.01)

(52) U.S. Cl.
CPC ............... *G02B 27/62* (2013.01); *G02B 7/005* (2013.01)

(58) Field of Classification Search
None
See application file for complete search history.

(56) References Cited

U.S. PATENT DOCUMENTS

| | | | |
|---|---|---|---|
| 6,679,635 B2 | 1/2004 | Miyamoto et al. | |
| 6,754,406 B2 | 6/2004 | Kaneshiro et al. | |
| 7,717,627 B2 | 5/2010 | Ice et al. | |
| 8,036,508 B2 | 10/2011 | Bhagavatula et al. | |
| 8,419,496 B1 * | 4/2013 | Smith et al. | 445/25 |
| 2004/0121503 A1 * | 6/2004 | Ferland et al. | 438/48 |
| 2005/0249464 A1 | 11/2005 | Case et al. | |
| 2009/0171184 A1 * | 7/2009 | Jenkins et al. | 600/411 |

\* cited by examiner

*Primary Examiner* — Frederick Bailey

(57) ABSTRACT

Vision-aided passive alignment systems and methods are provided that detect tilt misalignment of an optics system during the process of mounting the optics system on an upper surface of the circuit board and remove tilt misalignment to ensure that a lens of the optics system is precisely aligned with an optoelectronic device mounted on the upper surface of the circuit board.

25 Claims, 12 Drawing Sheets

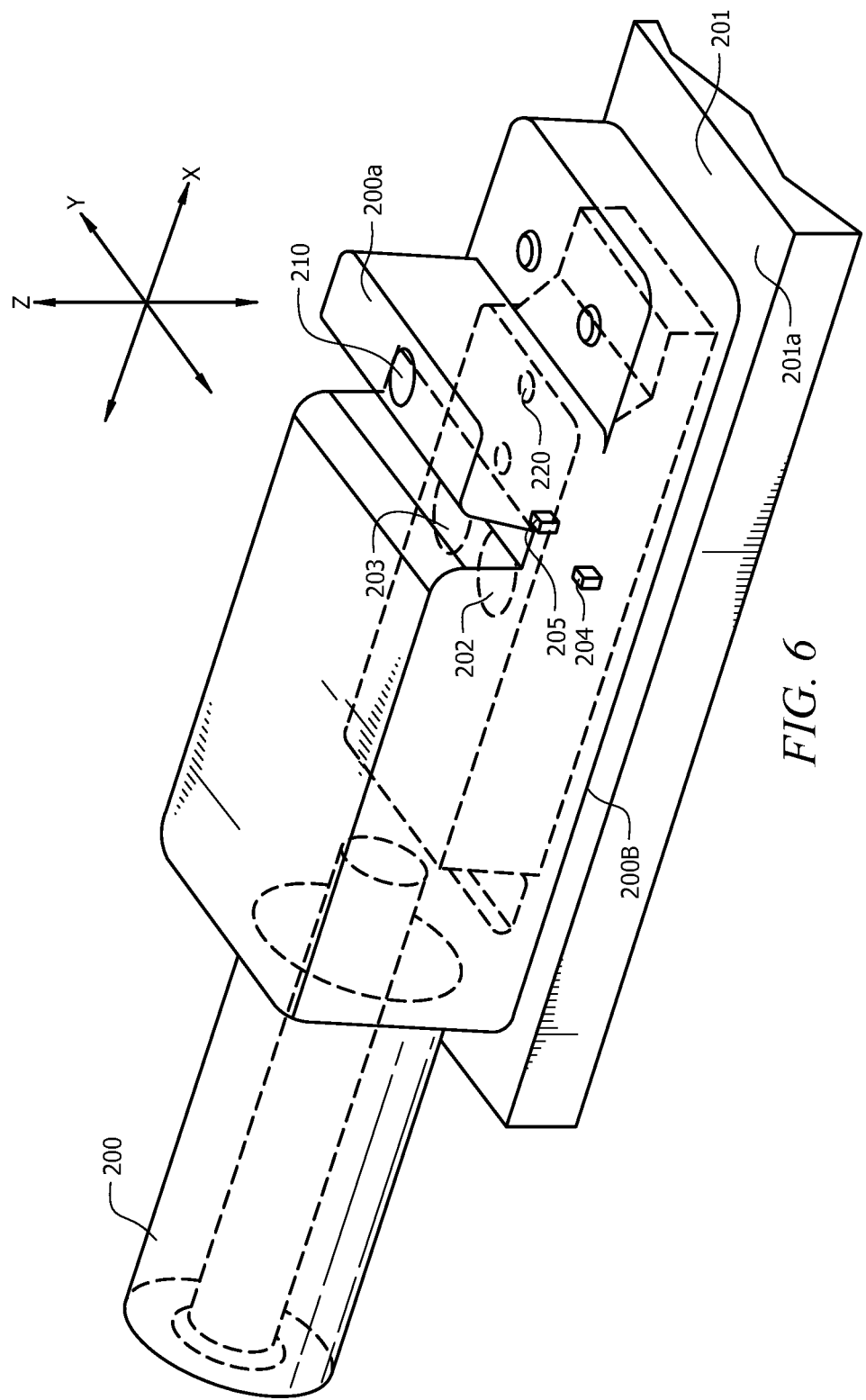

METHODS AND SYSTEMS FOR PERFORMING VISION-AIDED PASSIVE ALIGNMENT DURING THE ASSEMBLY OF AN OPTICAL COMMUNICATIONS MODULE

TECHNICAL FIELD OF THE INVENTION

The invention relates to optical communications modules. More particularly, the invention relates to systems and methods for performing vision-aided passive alignment during the assembly of an optical communications module.

BACKGROUND OF THE INVENTION

In optical communications networks, optical communications modules, which include optical transmitter modules, optical receiver modules, and optical transceiver modules, are used to transmit and/or receive optical signals over optical fibers. In a transmit portion of such an optical communications module, a light source generates modulated optical signals that represent data, which are then coupled by an optics system into an end of an optical fiber for transmission over the optical fiber. The light source may be a light-emitting diode or a laser such as, for example, a Vertical Cavity Surface Emitting Laser (VCSEL) or an edge-emitting laser. In a receive portion of such a module, an optics system directs light propagating out of the end of an optical fiber onto an optical detector, which converts the optical energy into electrical energy. A optical detector is typically a semiconductor photodiode device, such as a PIN (p-type/intrinsic/n-type) photodiode.

An optical communications module is commonly assembled by mounting the optoelectronic device, i.e., laser or optical detector, on a circuit board, making electrical connections between electrical contacts of the optoelectronic device and electrical contacts of the circuit board, and mounting an optics system on the circuit board. During the assembly process, a vision-aided passive alignment system and method are used in conjunction with fiducial features located on the optoelectronic device, the circuit board and/or on the optics system to ensure that the optics system and the optoelectronic device are properly aligned with one another throughout the mounting process. If the optic system and the optoelectronic device are not properly aligned with one another at completion of the mounting process, the optical coupling efficiency of the assembled optical communications module may be inadequate.

FIGS. 1A-1C illustrate side plan views of an optics system 2 being mounted on a circuit board 3 on which an optoelectronic device 4 is mounted during various stages of the mounting process. These figures demonstrate an example of the manner in which one type of misalignment can occur between the optic system 2 and the optoelectronic device 4 during the mounting process, even when a passive alignment process is used to prevent misalignment. It is also known to use active alignment processes to prevent misalignment from occurring during the mounting process, but because the invention is directed to passive alignment systems and processes, active alignment processes and systems will not be discussed herein in the interest of brevity.

During the mounting process, an upward-looking camera (not shown) of a vision system (not shown) captures images of a lens 5 disposed on a lower surface 2a of the optics system 2 as the optics system 2 and/or the circuit board 3 is moved by a positioning system (not shown) in the X-, Y- and/or Z-dimensions of an X, Y, Z Cartesian coordinate system. A downward-looking camera (not shown) of the vision system captures images of the optoelectronic device 4 as the optics system 2 and/or the circuit board 3 is moved in the X-, Y- and/or Z-dimensions. The images that are captured by the cameras are processed by a computer (not shown) of the vision system. The computer calculates positional adjustments that need to be made to the relative positions and/or orientations of the optoelectronic device 4 and the optics system 2 to maintain their alignment or to realign them. The computer then causes corresponding control signals to be sent to the positioning system, which then adjusts the relative positions and/or orientations of the circuit board 3 and/or the optics system 2 to ensure that they remain in alignment during and through completion of the mounting process.

At the stage of the mounting process shown in FIG. 1A, end surfaces 2b and 2c of two standoffs 2d and 2e, respectively, of the optics system 2 are about to come into contact with an upper surface 3a of the circuit board 3. The center 5a of the lens 5 and the aperture 4a of the optoelectronic device 4 are aligned with each other along a Z-axis of the X, Y, Z Cartesian Coordinate system. It can be seen in FIG. 1A that the X-Y plane in which the end surfaces 2b and 2c of the standoffs 2d and 2e, respectively, lie are not parallel with the plane in which the upper surface 3a of the circuit board 3 lies. Ideally, these surfaces are parallel to one another and parallel to the X-Y plane at the instant in time when the end surfaces 2b and 2c of the standoffs 2d and 2e, respectively, make contact with the upper surface 3a of the circuit board 3. In other words, the end surfaces 2b and 2c of the standoffs 2d and 2e, respectively, should make contact with the upper surface 3a of the circuit board 3 at precisely the same instant in time.

In the situation shown in FIG. 1A, although the center 5a of the lens 5 and the aperture 4a of the optoelectronic device 4 are aligned along the Z-axis, the X-Y plane in which the surfaces 2b and 2c of the standoffs 2d and 2e, respectively, lie is tilted by a tilt angle relative to the plane in which the upper surface 3a of the circuit board 3 lies. The magnitude of this tilt angle corresponds to an amount of linear misalignment in the X-dimension between the optics system 2 and the optoelectronic device 4. The amount of linear misalignment in the X-dimension that is present may be so small that the computer of the vision system will process the images captured by the cameras and make an erroneous determination that the lens 5 is in precise alignment with the optoelectronic device 4. Consequently, the computer will cause the motion system to continue to create the relative movement in the Z-dimension that is needed to mount the optics system 2 on the circuit board 3. There may also be tilt misalignment relative to the X-Z plane resulting in linear misalignment in the Y-dimension, but for ease of illustration and in the interest of brevity, only tilt misalignment relative to the X-Y plane is described with reference to FIGS. 1A-1C.

As shown in FIG. 1B, because of the tilt misalignment, the end surface 2b of standoff 2d comes into contact with the upper surface 3a of the circuit board 3 before the end surface 2c of standoff 2e comes into contact with the upper surface 3a of the circuit board 3. Subsequently, the end surface 2c of standoff 2e comes into contact with the upper surface 3a of the circuit board 3, as shown in FIG. 1C. Thus, the location where the upper surface 3a comes into contact with the end surface 2b of the standoff 2d acts as a pivot point. The result of the linear misalignment in the X-dimension is that the center 5a of lens 5 is not aligned with the aperture 4a of the optoelectronic device 4 in the Z-dimension in the final mounted configuration shown in FIG. 1C. In the example shown in FIGS. 1A-1C, the optics system 2 includes a 45° mirror 2f (FIG. 1C) that turns the optical path of the optics system 2 by an angle of 90°. The optical path portion 2g (FIG. 1C) should be coaxial with an optical axis of an optical fiber (not shown) that is inserted into a receptacle 2h (FIG. 1C) of the optics system 2. Because of the aforementioned misalignment, the optical path portion 2g will not be coaxial with the optical axis of the fiber, which results in optical coupling inefficiencies.

As the optics system 2 and the upper surface 3a of the circuit board 3 are moved into close proximity with one another, there will be an instant in time when the view from the upward-looking camera to the optics system 2 is occluded by the circuit board 3. After that instant in time, no real-time alignment adjustments are made due to the fact that the upward-looking camera can no longer obtain images of the lens 5 of the optics system. Therefore, the optics system 2 and the upper surface 3a of the circuit board 3 will be brought into contact with one another in accordance with the last alignment adjustment that was made using the last images from the downward- and upward-looking cameras. This can also result in the type of misalignment shown in FIG. 1C.

Accordingly, a need exists for a system and method for performing vision-aided passive alignment during the mounting process that ensure that the aforementioned misalignment problem does not occur.

SUMMARY OF THE INVENTION

The invention provides methods, systems and a computer program for performing vision-aided passive alignment during the process of mounting an optics system on an upper surface of a circuit board. The optics system has at least a first surface and a second surface that lie in first and second planes, respectively, of an X, Y, Z Cartesian coordinate system. The first and second planes are substantially parallel to one another and intersect a Z-axis of the coordinate system at first and second Z coordinates, respectively, where the first Z coordinate has a greater value than the second Z coordinate. At least first and second fiducial features are disposed on the first and second surfaces, respectively, of the optics system. A predetermined spatial relationship exists between the first and second fiducial features when the lower surface of the optics system lies in a plane that is parallel to an X-Y plane of the X, Y, Z Cartesian coordinate system. A spatial relationship that is other than the predetermined spatial relationship exists between the first and second fiducial features when the lower surface of the optics system lies in a plane that is not parallel to the X-Y plane of the Cartesian coordinate system.

The method comprises: illuminating the optics system with light; with an image capture system, capturing at least one image of the optics system that includes an image of the first and second fiducial features; with a computer, performing a passive-alignment algorithm that processes the at least one image to determine whether or not the predetermined spatial relationship exists, and if not, that generates at least one control signal corresponding to a tilt misalignment adjustment; and, with a positioning system, receiving the at least one control signal and adjusting an orientation of the optics system based on the control signal to eliminate or at least reduce a tilt misalignment of the lower surface of the optics system relative to the upper surface of the circuit board.

The system comprises a light source, an image capture system, a computer, and a positioning system. The computer performs a passive-alignment algorithm that processes the at least one image captured by the image capture system to determine whether or not the predetermined spatial relationship exists, and if not, generates at least one control signal corresponding to a tilt misalignment adjustment. The positioning system receives the at least one control signal and adjusts an orientation of the optics system based on the at least one control signal to eliminate or at least reduce a tilt misalignment of the lower surface of the optics system relative to the upper surface of the circuit board.

The computer program comprises first and second computer code segments. The first computer code segment processes at least one image captured by an image capture system. The image includes an image of the first and second fiducial features. The first computer code segment processes the at least one image to determine whether or not the predetermined spatial relationship exists. The second computer code segment generates at least one control signal if the first computer code segment determines that the predetermined spatial relationship does not exist. The at least one control signal corresponds to a tilt misalignment adjustment. The control signal is delivered to a positioning system of the vision-aided alignment system to cause the positioning system to adjust an orientation of the optics system based on the control signal to eliminate or at least reduce a tilt misalignment of the lower surface of the optics system relative to the upper surface of the circuit board.

These and other features and advantages of the invention will become apparent from the following description, drawings and claims.

BRIEF DESCRIPTION OF THE DRAWING

FIG. 6 illustrates a top perspective view of an optics system that has been successfully mounted on a circuit board by the system shown in FIG. 4 such that first and second lenses of the optics system are in precise optical alignment with optoelectronic devices mounted on an upper surface of the circuit board.

DETAILED DESCRIPTION OF AN ILLUSTRATIVE EMBODIMENT

In accordance with embodiments described herein, vision-aided passive alignment systems and methods are provided that detect tilt misalignment and compensate for tilt misalignment during the process of mounting the optics system on the circuit board. Illustrative, or exemplary, embodiments of the vision-aided passive alignment systems and methods will be described herein with reference to FIGS. 2-12.

Figure 1A:
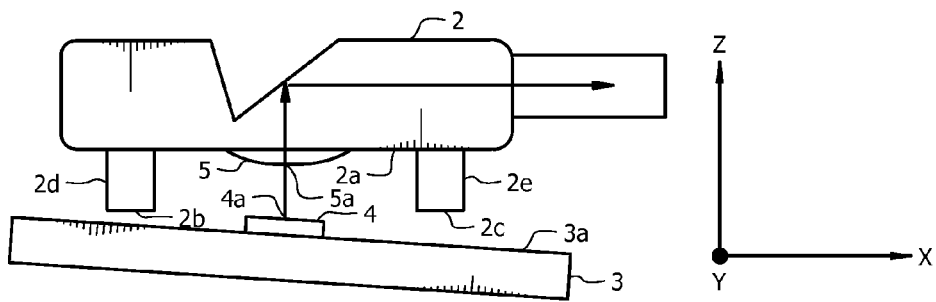
FIGS. 1A-1C illustrate side plan views of an optics system being mounted on a circuit board on which and optoelectronic device is mounted during various stages of the mounting process.
Figure 1B:
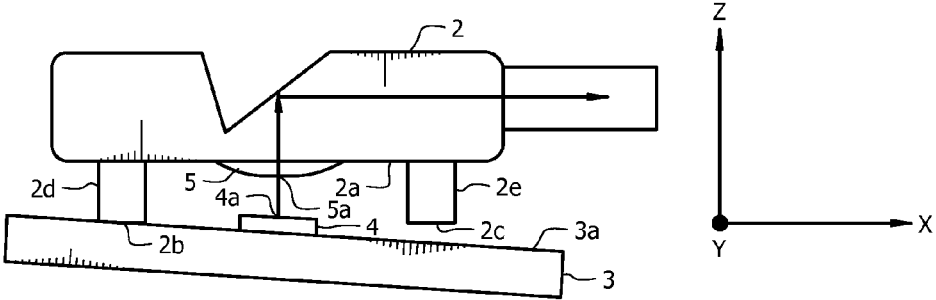
Figure 1C:
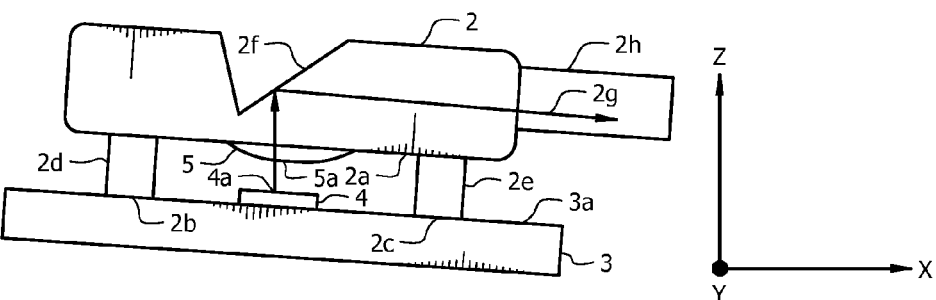
Figure 2:
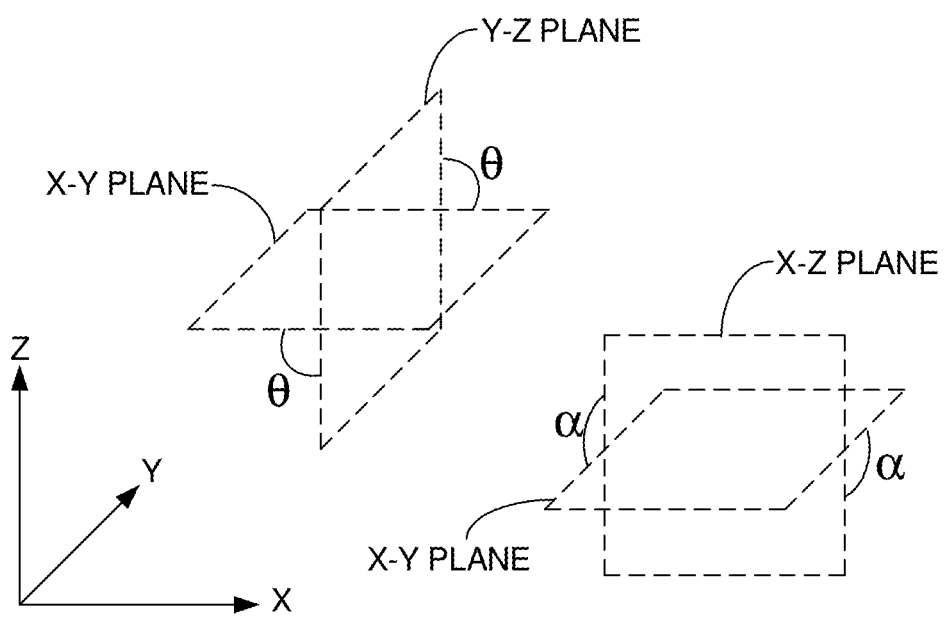
FIG. 2 illustrates an X, Y, Z Cartesian coordinate system.

Prior to describing the illustrative embodiments, the type of tilt misalignment that is being detected and compensated for by the systems and methods of the invention will be described with reference to FIG. 2. FIG. 2 illustrates an X, Y, Z Cartesian coordinate system. An X-Y plane is defined by the X and Y axes of the Cartesian coordinate system. A Y-Z plane is defined by the Y and Z axes of the Cartesian coordinate system. An X-Z plane is defined by the X and Z axes of the Cartesian coordinate system. The X-Y, Y-Z and X-Z planes intersect one another and are orthogonal to one another.

During the mounting process, the lower surface of the optics system and the upper surface of the circuit board should ideally be in planes that are parallel to one another. For the purpose of demonstrating the principles and concepts of the invention, it will be assumed herein that the upper surface of the circuit board is maintained in the X-Y plane throughout the mounting process such that it is only necessary to detect and compensate for tilt misalignment of the lower surface of the optics system. Thus, during the mounting process, the lower surface of the optics system and the upper surface of the circuit board should ideally be in planes that are parallel to one another, parallel to the X-Y plane, and perpendicular to the X-Z and Y-Z planes.

The tilt misalignment that is being detected and compensated for by the systems and methods of the invention includes an angular rotation by an angle, θ, of the plane in which the lower surface of the optics system lies relative to the Y-Z plane and/or an angular rotation by an angle, α, of the plane in which the lower surface of the optics system lies relative to the X-Z plane, where θ and α are angles other than 90°. Either of these types of tilt misalignment results in a tilt misalignment of the plane in which the lower surface of the optics system lies relative to the X-Y plane in which the upper surface of the circuit board is maintained. An angular rotation of the lower surface of the optics system relative to the Y-Z plane results in a misalignment of the lower surface of the optics system in the X-dimension, whereas an angular rotation of the lower surface of the optics system relative to the X-Z plane results in a misalignment of the lower surface of the optics system in the Y-dimension. An angular rotation of the lower surface of the optics system relative to the Y-Z plane and relative to the X-Z plane results in misalignment of the lower surface of the optics system in the X- and Y-dimensions. The term "tilt misalignment," as that term is used herein, is intended to denote any angular rotation of the lower surface of the optics system relative to the X-Y, Y-Z and/or X-Z planes that results in a misalignment of the lower surface of the optics system in the X-dimension and/or in the Y-dimension.

The systems and methods of the invention are capable of detecting such tilt misalignment of the lower surface of the optics system in the X-dimension and/or in the Y-dimension in real-time and compensating for the misalignment in real-time such that the lower surface of the optics system and the upper surface of the circuit board are parallel to one another at the instant in time that the optics system is placed in contact with the upper surface of the circuit board. In addition, the passive alignment system and process is also capable of making a determination after the optics system has been mounted on the upper surface of the circuit board as to whether or not the lens of the optics system is precisely aligned with the aperture of the optoelectronic device, and if not, of making additional real-time adjustments to the relative positions of the optics system and the circuit board to bring the lens of the optics system into precise alignment with the aperture of the optoelectronic device. Various illustrative, or exemplary, embodiments for detecting and compensating for such tilt misalignment in real-time will now be described with reference to FIGS. 3-12.

Figure 3:
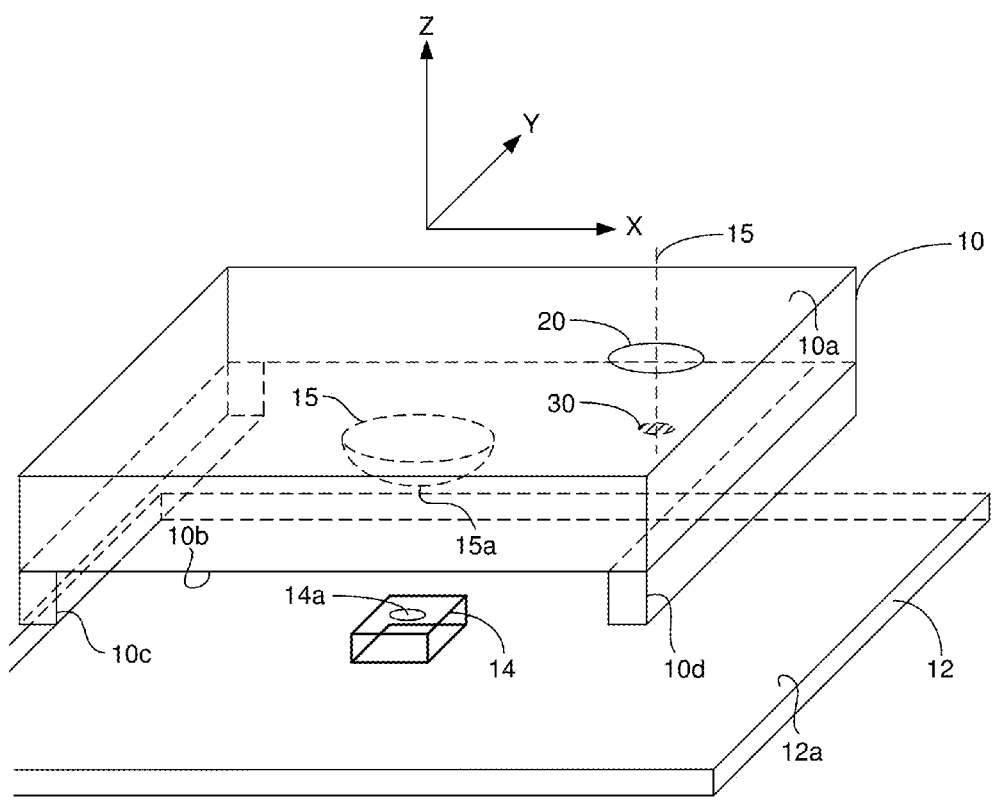
FIG. 3 illustrates a top perspective view of an optics system being mounted on an upper surface of a circuit board.

FIG. 3 illustrates a top perspective view of an optics system 10 being mounted on an upper surface 12a of a circuit board 12, which may be, for example, a printed circuit board (PCB). An optoelectronic device 14 is mounted on the upper surface 12a of the circuit board 12. The optoelectronic device 14 has an aperture 14a. A lens 15 is disposed on a lower surface 10b of the optics system 10. The lens 15 has a center 15a. In accordance with this illustrative embodiment, a transparent circular feature 20 is formed on an upper surface 10a of the optics system 10 and a darkened circular feature 30 is formed on the lower surface 10b of the optics system 10. The transparent circular feature 20 and the darkened circular feature 30 are concentric with one another in the Z-dimension such that, when the lower surface 10b is parallel to the X-Y plane and perpendicular to the Y-Z and X-Z planes, an imaginary line 15 that is parallel to the Z-axis and perpendicular to the upper and lower surfaces 10a and 10b, respectively, passes through the respective centers of the circular features 20 and 30.

As will be described in detail below, during the mounting process, images of these circular features 20 and 30 are used to detect any tilt misalignment of the optics system 10 relative to the circuit board 12 and to adjust the position and/or orientation of the optics system 10 such that any tilt misalignment is compensated for, i.e., removed. As indicated above, when there is no tilt misalignment, the plane in which the lower surface 10b of the optics system 10 lies is parallel to the upper surface 12a of the circuit board 12, and therefore the imaginary line 15 passes through the respective centers of the circular features 20 and 30. When there is some amount of tilt misalignment, the respective centers of the circular features 20 and 30 are not aligned on imaginary line 15. When this happens, the amount of tilt misalignment that exists is determined and compensated for by the methods and systems of the invention such that the respective centers of the circular features 20 and 30 are aligned on the imaginary line 15 at the instant in time when the lower surfaces of standoffs 10c and 10d the optics system 10 come into contact with the upper surface 12a of the circuit board 12, as will now be described in more detail with reference to FIGS. 4-5B.

As will be described below in detail, the passive alignment system and process are also capable of determining whether any misalignment exists after the optics system 10 has been placed in contact with the upper surface 12a of the circuit board 12, and if so, of adjusting the position and/or orientation of the optics system 10 and/or of the circuit board 12 to remove any misalignment.

Figure 4:
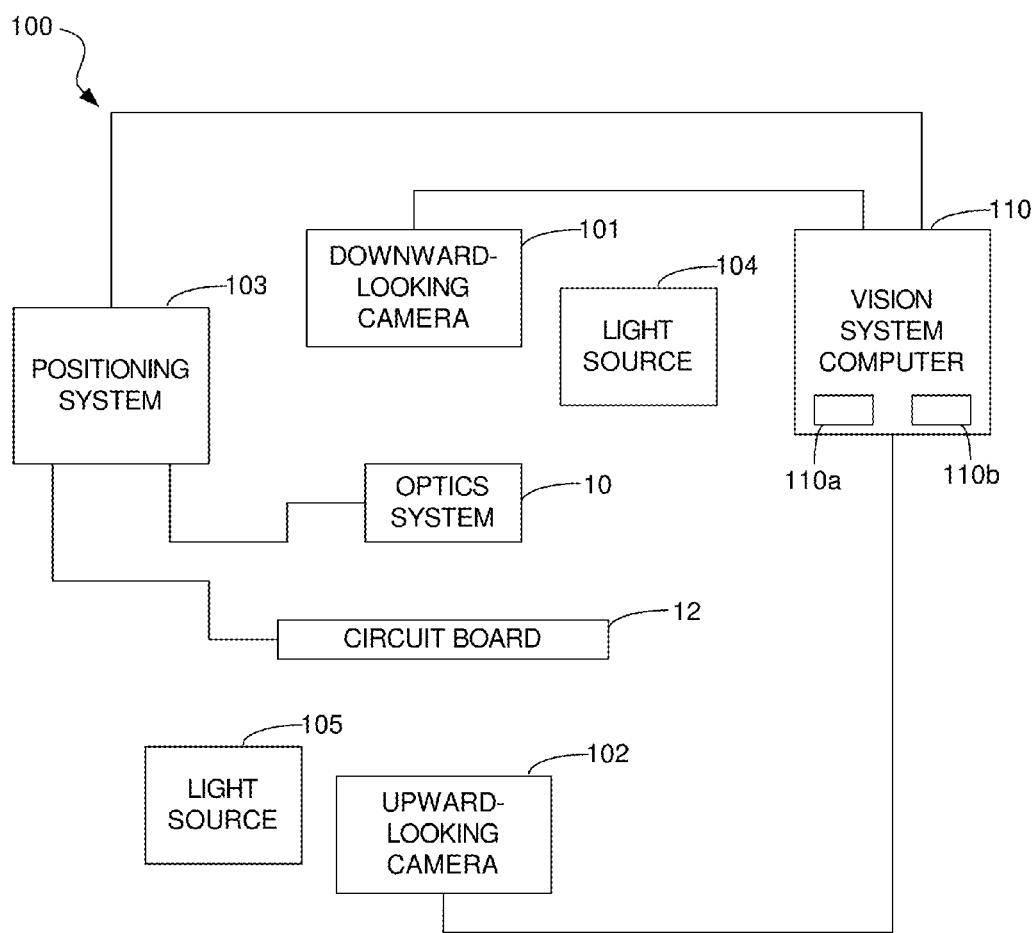
FIG. 4 illustrates a block diagram of the vision-aided passive alignment system in accordance with an illustrative embodiment.

FIG. 4 illustrates a block diagram of the vision-aided passive alignment system 100 in accordance with an illustrative embodiment. The manner in which the system 100 may be used to detect and eliminate tilt misalignment during the mounting process will be described with reference to FIGS. 3 and 4. The system 100 includes a downward-looking camera 101, an upward-looking camera 102, a positioning system 103, a light source 104, a light source 105, and a computer 110. During the mounting process, the light source 104 illuminates the optics system 10 with light as the downward-looking camera 101 captures images that contain the transparent circular feature 20 and the darkened circular feature 30. The light source 105 illuminates the lower surface of the optics system 10 as the upward-looking camera 102 captures images of the lower surface of the optics system 10 that contain the lens 15 of the optics system 10.

The upward- and downward-looking cameras 101 and 102 are calibrated with one another prior to the vision-aided passive alignment process being performed such that the images that are captured by the cameras 101 and 102 can be combined into a composite three-dimensional (3-D) image in the X, Y, Z Cartesian coordinate system. Because the manner in which cameras located at different positions relative to an object may be calibrated to enable images captured by the cameras to be combined into a composite image in an X, Y, Z Cartesian coordinate system is known, the calibration method and the method by which the composite images are created will not be described herein in the interest of brevity.

The optics system 10 is transparent to the wavelength of light emitted by the light source 104. The darkened circular feature 30 either absorbs light of the wavelength emitted by the light source 104 or reflects light of the wavelength emitted by the light source 104 in directions away from downward-looking camera 101. In this way, the darkened circular feature 30 appears dark in images that are captured by the downward-looking camera 101. In accordance with this illustrative embodiment, the transparent circular feature 20 is an area that has been polished to create a well-defined transparent circular window in the optics system 10. Therefore, the darkened circular feature 30 is visible to the downward-looking camera 101 through the transparent circular feature 20, and the transparent circular feature 20 appears lighter than the darkened circular feature 30 in images that are captured by the downward-looking camera 101.

Figure 5A:
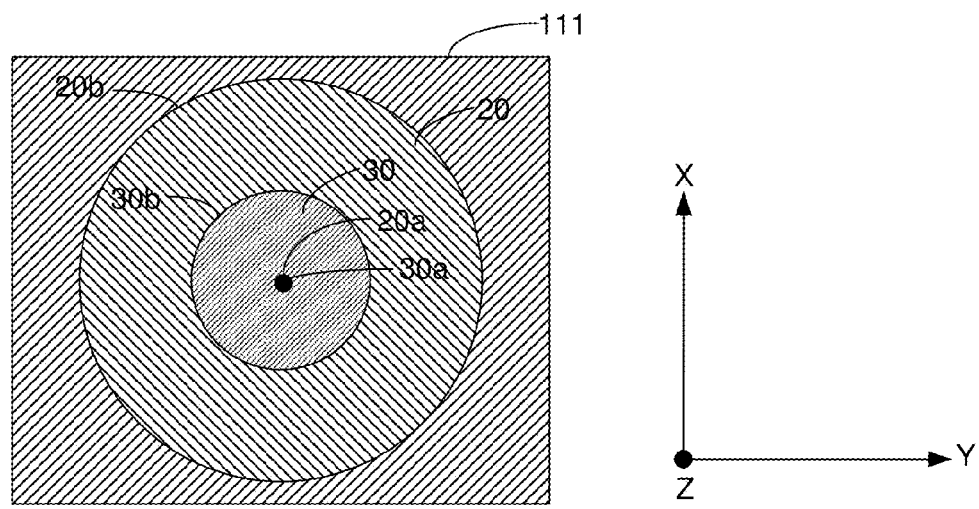
FIGS. 5A and 5B illustrate two images of the optics system shown in FIG. 3 that were captured by the downward-looking camera shown in FIG. 4 at an instant in time when there was no tilt misalignment and at an instant in time when there was some amount of tilt misalignment, respectively.
Figure 5B:
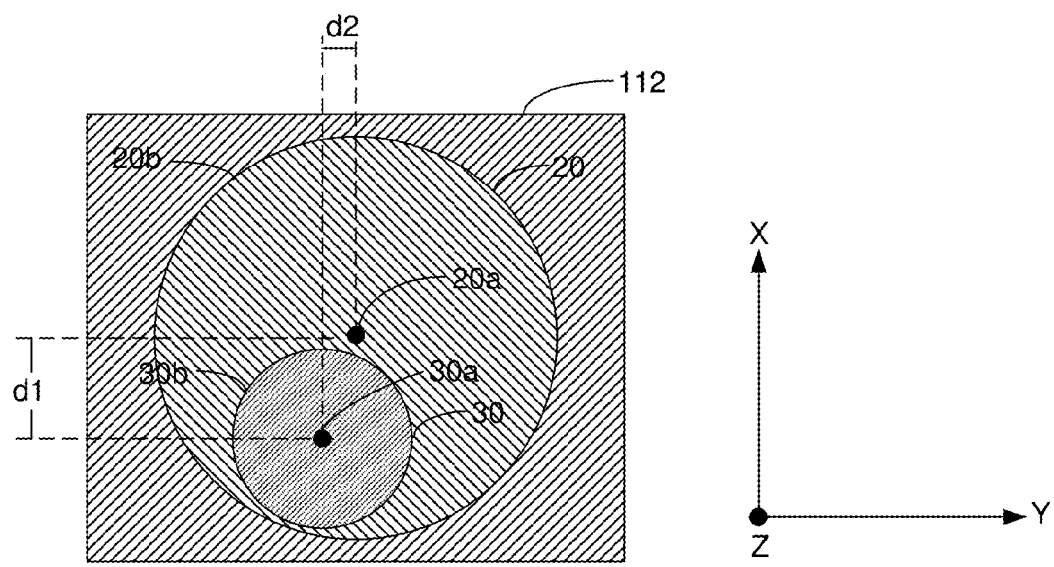

FIGS. 5A and 5B illustrate two images 111 and 112 of the optics system 10 shown in FIG. 3 that were captured by the downward-looking camera 101 shown in FIG. 4 at an instant in time when there was no tilt misalignment and at an instant in time when there was some amount of tilt misalignment, respectively. With reference to FIG. 5A, when there is no tilt misalignment, it can be seen that the respective centers 20a and 30a of the transparent circular feature 20 and of the darkened circular feature 30 have the same X and Y coordinates. Thus, when there is no tilt misalignment, the centers 20a and 30a are aligned along the imaginary line 15 (FIG. 3), which is parallel to the Z-axis and perpendicular to the X- and Y-axes. With reference to FIG. 5B, it can be seen that when there is some amount of tilt misalignment of the lower surface of the optics system 10 resulting in misalignment in the X- and Y-dimensions, the centers 20a and 30a of the transparent circular feature 20 and of the darkened circular feature 30, respectively, have different X and Y coordinates. Because of this tilt misalignment, the centers 20a and 30a are separated from each other by a first distance, d1, in the X-dimension and by a second distance, d2, in the Y-dimension.

The computer 110 (FIG. 4) includes a processing device 110a such as, for example, one or more microprocessors or microcontrollers, that performs a passive-alignment algorithm that processes the images that are captured by the downward-looking camera 101 to determine the positions of the transparent circular feature 20 and of the darkened circular feature 30 relative to one another and to determine, based on the relative positions, adjustments that need to be made to the position and/or orientation of the optics system 10 to remove any tilt misalignment. The computer code comprising the passive-alignment algorithm is stored on a memory device 110b of the computer 110. The memory device is a non-transitory computer-readable medium such as, for example, a random-access memory (RAM) device, a read-only memory (ROM) device, a programmable ROM (PROM), an erasable PROM (EPROM) device, or a flash memory device.

When the computer 110 performs the passive-alignment algorithm, the computer 110 calculates the distances, d1 and d2, between the centers 20a and 30a and then calculates, based on the values of d1 and d2, a tilt adjustment to be made to the optics system 10 to remove the tilt misalignment such that d1=d2=0, i.e., such that the centers 20a and 30a are co-located in the X-Y plane. Well known mathematics may be used to convert linear distances into angular values. Therefore, in the interest of brevity, the manner in which the values of d1 and d2 are translated into angular adjustments will not be discussed herein. The computer 110 makes these determinations in real-time and generates control signals in real-time that are delivered in real-time to the positioning system 103, which then causes the position and/or orientation of the optics system 10 to be adjusted in real-time until the centers 20a and 30a have the same X and Y coordinates (i.e., the centers 20a and 30a are co-located in the X-Y plane).

In order to determine the X, Y coordinates of the centers 20a and 30a, the passive-alignment algorithm includes an edge-detection algorithm that scans the pixels that make up the images 111 and 112 and detects the outer edges 20b and 30b of the transparent circular feature 20 and of the darkened circular feature 30, respectively. Because edge-detection algorithms that are suitable for this purpose are well known, a detailed discussion of the manner in which the outer edges 20b and 30b are detected will not be provided herein in the interest of brevity. Once the outer edges 20b and 30b have been detected, the respective diameters of the circular features 20 and 30 are determined by the passive-alignment algorithm. Once these diameters have been determined, the respective X, Y coordinates of the centers 20a and 30a are determined by the passive-alignment algorithm. Once the X, Y coordinates of the centers 20a and 30a have been determined, the distances, d1 and d2, between the centers 20a and 30a, respectively, are determined by the passive-alignment algorithm.

Having determined the distances d1 and d2, the passive-alignment algorithm then calculates the tilt adjustment that is needed to remove the tilt misalignment and causes corresponding control signals to be sent to the positioning system 103. If the distances d1 and d2 are equal to zero, then no tilt adjustment needs to be made because there is no tilt misalignment; otherwise, a tilt adjustment will need to be made. The positioning system 103 then adjusts the position and/or orientation of the optics system 10 to remove the tilt misalignment. This process of detecting any tilt misalignment and of removing any tilt misalignment is performed in real-time during the mounting process such that at the instant in time when the optics system 10 is mounted on the upper surface of the circuit board 12, the planes of the lower surface of the optics system 10 and the upper surface of the circuit board 12 are parallel, or at least sufficiently parallel, to one another.

The passive alignment algorithm described above with reference to FIGS. 4-5B is designed to ensure that any tilt misalignment has been removed just prior to the instant in time when the optics system 10 is placed in contact with the upper surface of the circuit board 12. However, for a variety of reasons, it is possible that some amount of tilt misalignment will exist at the instant in time when the optics system 10 is placed in contact with the upper surface of the circuit board 12. For this reason, it is desirable to be able to determine whether there is any misalignment between the lens 15 of the optics system 10 and the optoelectronic device 14 after the optics system 10 has been mounted on the circuit board 12, and if so, to make positional adjustments to remove any misalignment. The manner in which this may be accomplished will now be described with reference again to FIGS. 4-5B.

As described above, the downward-looking camera 101 captures images that contain the circular features 20 and 30. The upward-looking camera 102 captures images of the lower surface 10b of the circuit board 10 that include the lens 15. As described above, the passive-alignment algorithm includes an edge-detection algorithm that detects the edges of the circular features 20 and 30, and based on that information, determines the X, Y and Z coordinates of the centers 20a and 30a of the circular features 20 and 30, respectively. The edge-detection algorithm also detects the edges of the lens 15, and based on that information, determines the X, Y and Z coordinates of the center 15a of the lens 15.

After determining the X, Y and Z coordinates of the centers 20a, 30a and 15a, the passive-alignment algorithm performs a mapping algorithm that spatially relates the centers 20a, 30a and 15a to one another through vectors and obtains X, Y and Z coordinates for each of the centers 20a, 30a and 15a. The mapping algorithm is performed prior to the view from the upward-looking camera 102 to the optics system 10 being occluded by the circuit board 12. The mapping algorithm is also performed at a time when there is no tilt misalignment. The spatial relationship among the centers 20a, 30a and 15a that is determined by the mapping algorithm is stored in the memory device 110b.

After the optics system 10 has been mounted on the upper surface 12a of the circuit board 12, the passive-alignment algorithm processes images of the circular features 20 and 30 obtained by the downward-looking camera 101 to determine the current X, Y and Z coordinates of the centers 20a and 30a of the circular features 20 and 30, respectively. Because the mapping algorithm has previously determined the spatial relationship between the centers 20a and 30a of the circular features 20 and 30, respectively, and the center 15a of the lens 15, the passive-alignment algorithm uses the current X, Y and Z coordinates of the centers 20a and 30a and the stored spatial relationship to calculate the current X, Y and Z coordinates of the center 15a. This information provides the passive-alignment algorithm with the current spatial relationship among the centers 20a, 30a and 15a.

The passive-alignment algorithm then compares the current spatial relationship among the centers 20a, 30a and 15a with the spatial relationship among the centers 20a, 30a and 15a that is stored in the memory device 110b. Based on this comparison, the passive-alignment algorithm determines any adjustment that needs to be made to the position and/or orientation of the optics system 10 relative to the circuit board 12 to perfect the alignment between the lens 15 of the optics system 10 and the aperture 14a of the optoelectronic device 14. The computer 110 then sends corresponding control signals to the positioning system 103 to cause it to adjust the position and/or orientation of the optics system 10 relative to the circuit board 12. This process may be repeated as many times as needed until a determination is made by the computer 110 that the current spatial relationship matches the spatial relationship stored in the memory device 110b. When the spatial relationships match, the alignment between the lens 15 of the optics system 10 and the aperture 14a of the optoelectronic device 14 has been perfected or has been achieved with sufficient accuracy.

Another benefit of using the mapping algorithm is that it allows there to be less accuracy when the positioning system 103 is mounting the optics system 10 on the circuit board 12. If the mapping algorithm is not used, the positioning system 103 will need to be extremely accurate to ensure that any tilt misalignment has been removed just prior to the instant in time when the optics system 10 is mounted on the circuit board 12. By using the mapping algorithm, if any tilt misalignment existed when the optics system 10 was mounted on the circuit board 12, the extent of the misalignment can be determined by comparing the current spatial relationship between the centers 20a, 30a and 15a with the stored spatial relationship between the centers 20a, 30a and 15a. Adjustments to the relative positions and/or orientations of the optics system 10 and the circuit board 12 can then be made to remove any misalignment. In many cases, the latter approach is much easier than attempting to maintain perfect or near-perfect alignment throughout the mounting process.

FIG. 6 illustrates a top perspective view of an optics system 200 that has been successfully mounted on a circuit board 201 by the system 100 shown in FIG. 4 such that first and second lenses 202 and 203, respectively, of the optics system 200 are in precise optical alignment with optoelectronic devices 204 and 205, respectively, which are mounted on an upper surface 201a of the circuit board 201. The optics system 200 has a transparent circular feature 210 and a darkened circular feature 220 on its upper and lower surfaces 200a and 200b, respectively, which are identical to the transparent circular feature 20 and the darkened circular feature 30, respectively, shown in FIG. 3. The transparent circular feature 210 and the darkened circular feature 220 were used in the manner described above with reference to FIGS. 3-5B to determine any tilt misalignment that existed during the alignment process and to remove any tilt misalignment to ensure that the first and second lenses 202 and 203, respectively, remained in precise optical alignment with the optoelectronic devices 204 and 205, respectively, during the mounting process. The aforementioned mapping algorithm may be used to determine whether or not the spatial relationship between the centers of the lenses 202 and 203 and the centers of the circular features 210 and 220 that exists after the optics system 200 has been mounted on the circuit board 201 matches the stored spatial relationship between the centers of the lenses 202 and 203 and the centers of the circular features 210 into 20. If not, the optics system 200 may be repositioned to remove any misalignment.

Figure 7:
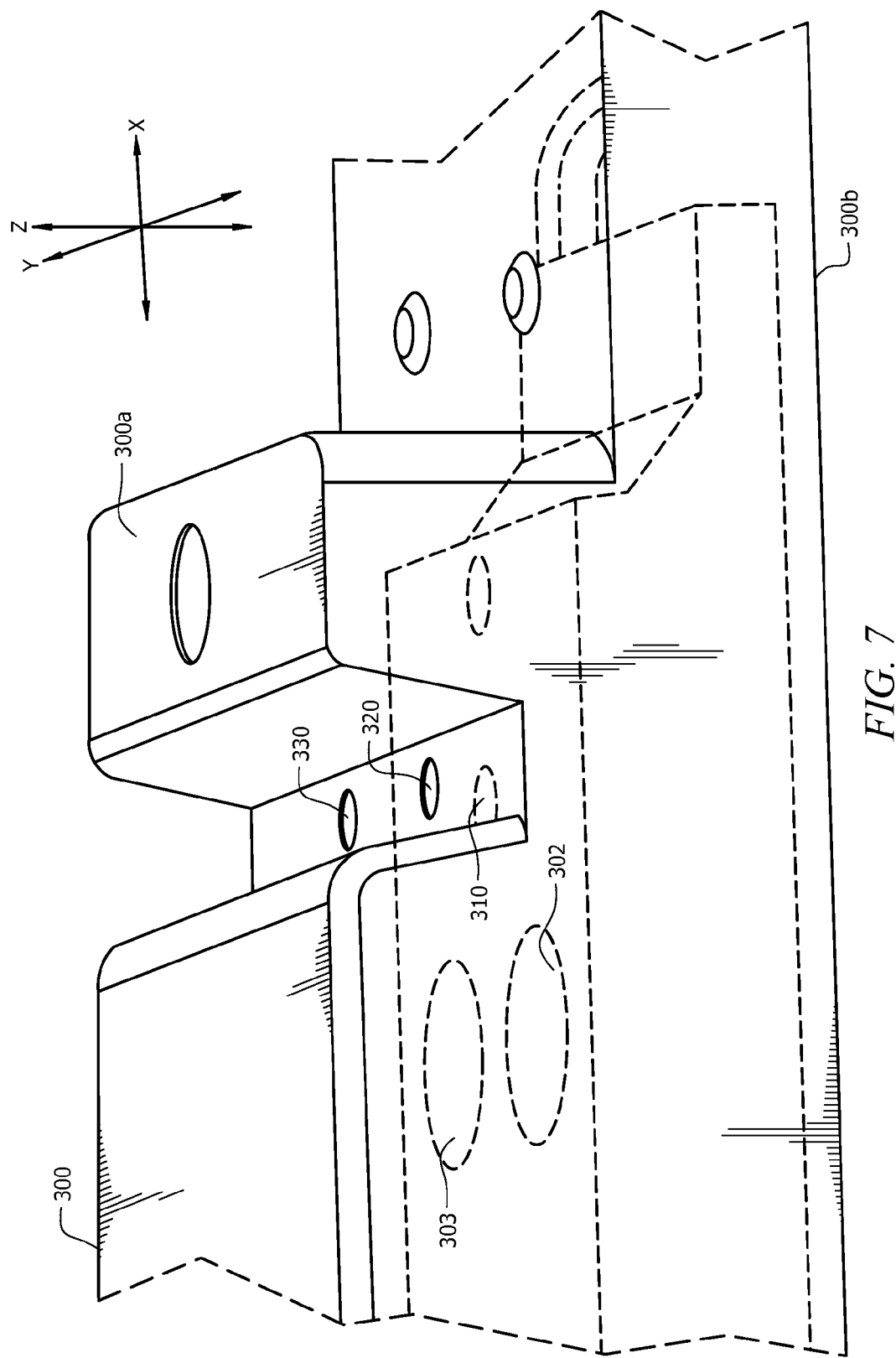
FIG. 7 illustrates a top perspective view of an optics system that is similar to the optics system shown in FIG. 6 except that the optics system shown in FIG. 7 utilizes different features than those described above with reference to FIG. 6 to detect and compensate for tilt misalignment.

FIG. 7 illustrates a top perspective view of an optics system 300 that is similar to the optics system 200 shown in FIG. 6 except that the optics system 300 utilizes different features than those described above with reference to FIG. 6 to detect and compensate for tilt misalignment. Like the optics system 200 shown in FIG. 6, the optics system 300 shown in FIG. 7 has first and second lenses 302 and 303, respectively, that need to be aligned with respective optoelectronic devices (not shown) disposed on an upper surface of a circuit board (not shown). In order to detect and compensate for tilt misalignment during the mounting process, the optics system 300 includes first, second and third circular features 310, 320 and 330, respectively.

Figure 8:
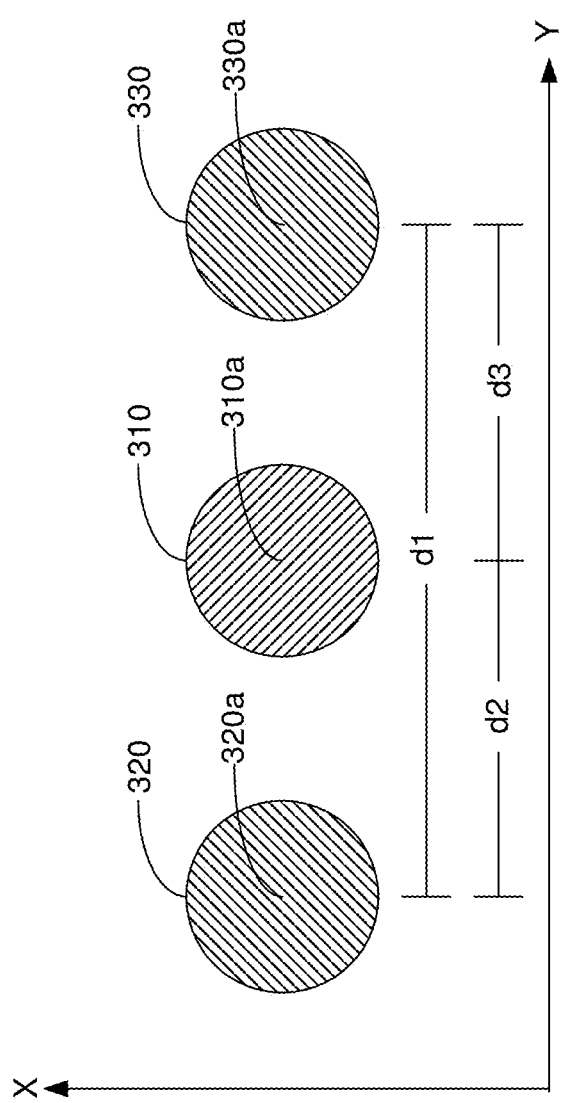
FIG. 8 illustrates a top view of the first, second and third circular features shown in FIG. 7.

The circular features 310, 320 and 330 are disposed at different locations in the optics system 300. FIG. 8 illustrates a top view of the first, second and third circular features 310, 320 and 330, respectively, shown in FIG. 7. The first, second and third circular features 310, 320 and 330, respectively, will now be described with reference to FIGS. 7 and 8. For the purpose of describing these features 310, 320 and 330, it will be assumed that the upper and lower surfaces 300a and 300b, respectively, of the optics system 300 lie in respective planes that are parallel to the X-Y plane and parallel to each other, but have different Z coordinates. The first and second lenses 302 and 303, respectively, are disposed on the lower surface 300b of the optics system 300 and lie in a common plane that is parallel to the X-Y plane. The first circular feature 310 also is disposed on the lower surface 300b, and thus lies in the same plane as the first and second lenses 302 and 303. The second and third circular features 320 and 330 lie in a common plane that is parallel to the plane in which the first and second lenses 302 and 303 and the first circular feature 310 lie, but that has a different Z-coordinate. The centers 320a and 330a of the second and third circular features 320 and 330, respectively, have the same X and Z coordinates, but have different Y coordinates. The center 310a (FIG. 8) of the first circular feature 310 has the same X coordinate as the centers 320a and 330a (FIG. 8) of the second and third circular features 320 and 330, respectively, but has different Y and Z coordinates than those of the second and third circular features 320 and 330, respectively.

With reference to FIG. 8, when there is no tilt misalignment in the Y-dimension, the distance between the centers 320a and 330a of the second and third circular features 320 and 330, respectively, is equal to a first predetermined value, d1, and the distances between the center 310a of the first circular feature 310 and the centers 320a and 330a of the second and third circular features 320 and 330, respectively, are equal to second and third predetermined values, d2 and d3, respectively. When there is some amount of tilt misalignment in the Y-dimension, these respective distances will not be equal to the respective predetermined values d1, d2 and d3 in the captured images. Similarly, the centers 310a, 320a and 330a have the same X coordinate when there is no tilt misalignment in the X-dimension, but will not have the same X coordinate when there is some amount of tilt misalignment in the X-dimension.

The passive-alignment algorithm performed by the computer 110 analyzes images captured by the downward-looking camera 101 and by the upward-looking camera 102 to determine the X and Y coordinates of the centers 310a, 320a and 330a and then uses that information to calculate the differences between the respective distances and the respective predetermined values of d1, d2 and d3. These differences are then used to determine the extent and direction of tilt misalignment. Similarly, the passive-alignment algorithm analyzes images captured by the downward-looking camera 101 and by the upward-looking camera 102 to determine whether there are any differences between the X coordinates of the centers 310a, 320a and 330a and if so, uses that information to calculate the amount of tilt misalignment that exists in the X-dimension. A similar process is used to determine whether there are any differences between the Y coordinates of the centers 310a, 320a and 330a and if so, uses that information to calculate the amount of tilt misalignment that exists in the Y-dimension.

The passive-alignment algorithm then calculates a tilt adjustment to be made to the optics system 300 based on the determined extent and direction of tilt misalignment. If there is a tilt adjustment to be made, the computer 110 sends control signals to the positioning system 103 to cause the position and/or orientation of the optics system 300 to be adjusted to remove any tilt misalignment. This process of determining whether or not there is any tilt misalignment and of removing any tilt misalignment typically is performed in real-time during the mounting process to ensure that no tilt misalignment exists at the instant in time when the optics system 300 is mounted on the circuit board (not shown).

The mapping algorithm described above may be used to generate a spatial relationship among the centers 310a, 320a and 330a of the circular features 310, 320 and 330, respectively, and the centers of the lenses 302 and 303. After the optics system 300 has been mounted on the circuit board, the mapping algorithm determines the current spatial relationship and compares it with a previous spatial relationship stored in the memory device 110b to determine whether any misalignment exists. If any misalignment does exist, then the positioning system 103 will reposition the optics system 300 on the circuit board such that any misalignment is removed.

Figure 9:
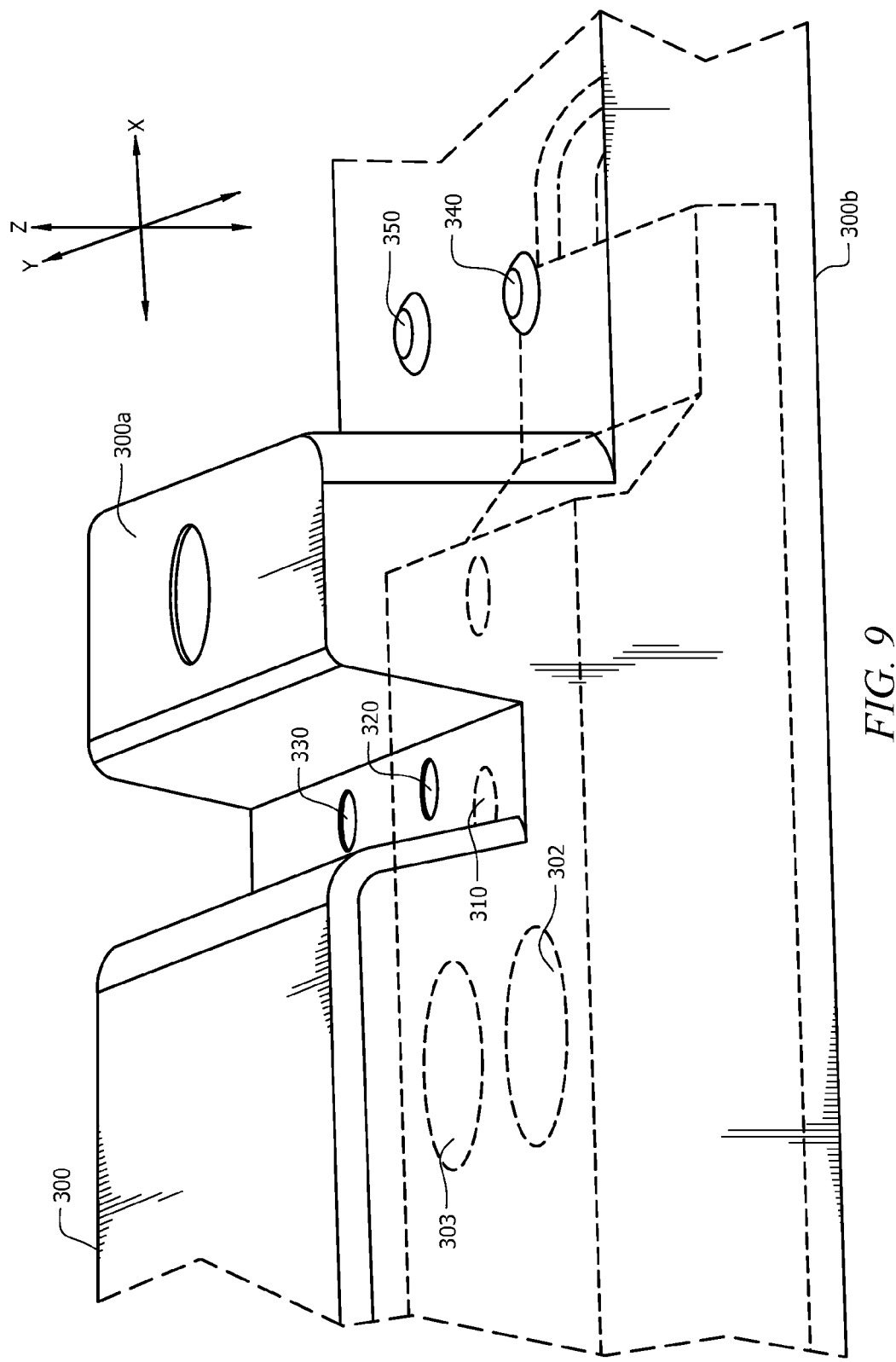
FIG. 9 illustrates the same top perspective view of the optics system shown in FIG. 7, but with fourth and fifth circular features referenced to demonstrate another illustrative embodiment.
Figure 10:
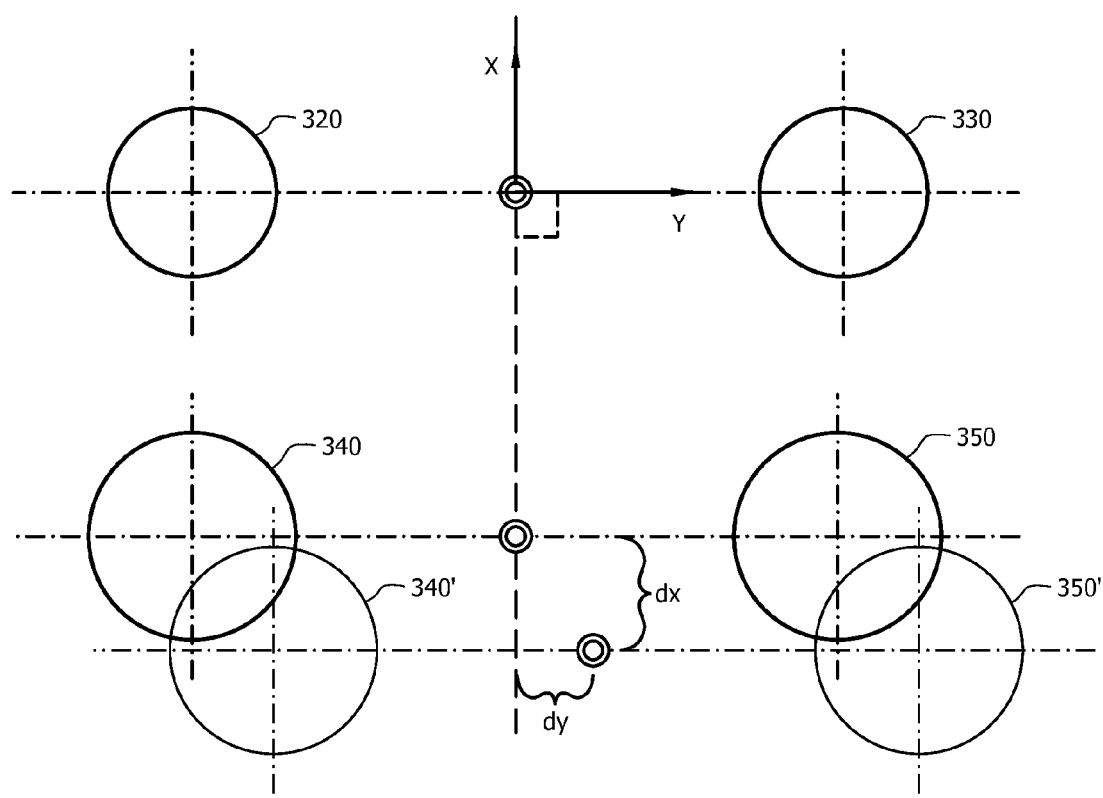
FIG. 10 illustrates a top view of the second, third, fourth, and fifth circular features shown in FIG. 9 where a tilt misalignment has occurred such that a subsequent image of the circular features indicates that their locations have shifted in the X- and Y-dimensions.

FIG. 9 illustrates the same top perspective view of the optics system 300 shown in FIG. 7, but with fourth and fifth circular features 340 and 350, respectively, referenced to demonstrate another illustrative embodiment. FIG. 10 illustrates a top view of the second, third, fourth, and fifth circular features 320, 330, 340, and 350, respectively, shown in FIG. 9 where a tilt misalignment has occurred such that a subsequent image of the circular features 340' and 350' indicates that their locations have shifted in the X- and Y-dimensions. The manner in which the second, third, fourth, and fifth circular features 320, 330, 340, and 350, respectively, are used to detect and remove tilt misalignment will now be described with reference to FIGS. 9 and 10. The fourth and fifth circular features 340 and 350 and the first and second lenses 302 and 303 all lie in a common plane that is parallel to the X-Y plane. This common plane is parallel to the planes in which the upper and lower surfaces 300a and 300b, respectively, of the optics system 300 lie. Thus, the plane in which the fourth and fifth circular features 340 and 350 lie is parallel, or at least substantially parallel within manufacturing tolerances, to the plane in which the second and third circular features 320 and 330 lie, but the two planes have different Z coordinates.

The method for using the circular features 320, 330, 340, and 350 to determine whether there is any tilt misalignment, and if so, to remove any tilt misalignment is similar to the method described above with reference to FIGS. 6-8. The centers of each of the circular features 320, 330, 340, and 350 have known X and Y coordinates. The orientation of the optics system 300 when the upper and lower surfaces 300a and 300b, respectively, of the optics system 300 are parallel to the X-Y plane will be referred to hereinafter as the aligned orientation. When the optics system 300 is in the aligned orientation, known spatial relationships exist among the centers of the circular features 320, 330, 340, and 350, and the centers are at known distances from one another. These known spatial relationships and distances are used during the mounting process to determine whether any tilt misalignment exists, and if so, to remove any tilt misalignment.

During the mounting process, the passive-alignment algorithm performed by the computer 110 (FIG. 4) analyzes images captured by the downward-looking camera 101 to determine the X and Y coordinates of the centers of the circular features 320, 330, 340, and 350. As the computer 110 sends control signals to the positioning system 103 to cause it to move the optics system 300 toward the circuit board (not shown), the computer 110 continually or periodically analyzes the images captured by the downward-looking camera 101 and determines the X and Y coordinates of the centers of features 320, 330, 340, and 350. At each current position and orientation, the computer 110 compares the current spatial relationship among the centers of the optics system 300 to the known spatial relationships among the centers when the optics system 300 was in the aligned orientation. Based on these comparisons, the computer 110 determines the extent and direction of any tilt misalignment and causes control signals to be sent to the positioning system 103 to adjust the position and/or orientation of the optics system 300 to remove any tilt misalignment.

The mapping algorithm described above may also be used to determine whether or not a spatial relationship among the centers of the circular features 320, 330, 340, and 350 and the centers of the lenses 302 and 303 that was previously determined at a time when there was no tilt misalignment and stored in the memory device 110b matches a current spatial relationship among the centers of the circular features 320, 330, 340, and 350 and the centers of the lenses 302 and 303 that has been determined to exist after the optics system 300 has been mounted on the circuit board. Any mismatch between the previous and current spatial relationships would then be used to adjust the position and/or orientation of the optics system 300 relative to the circuit board (not shown) to remove any misalignment.

It should be noted that many variations may be made to the embodiments described above without deviating from the scope of the invention. For example, while separate light sources 104 and 105 are shown in FIG. 4, separate light sources may not be needed in all cases. For example, ambient light from ambient light sources that are available in the environment may provide suitable lighting conditions. Also, while a downward-looking camera 101 and an upward-looking camera 102 are shown in FIG. 4, the passive-alignment algorithm may use images captured by one or the other of these cameras 101 and 102, but not both. Conversely, more than two cameras may be used for this purpose. Therefore, the image capture system that is used for this purpose comprises one or more cameras. In addition, while the fiducial features 20, 30, 210, 220, 310, 320, 330, 340, and 350 have been described as being circular features, these fiducial features may have non-circular shapes.

Figure 11:
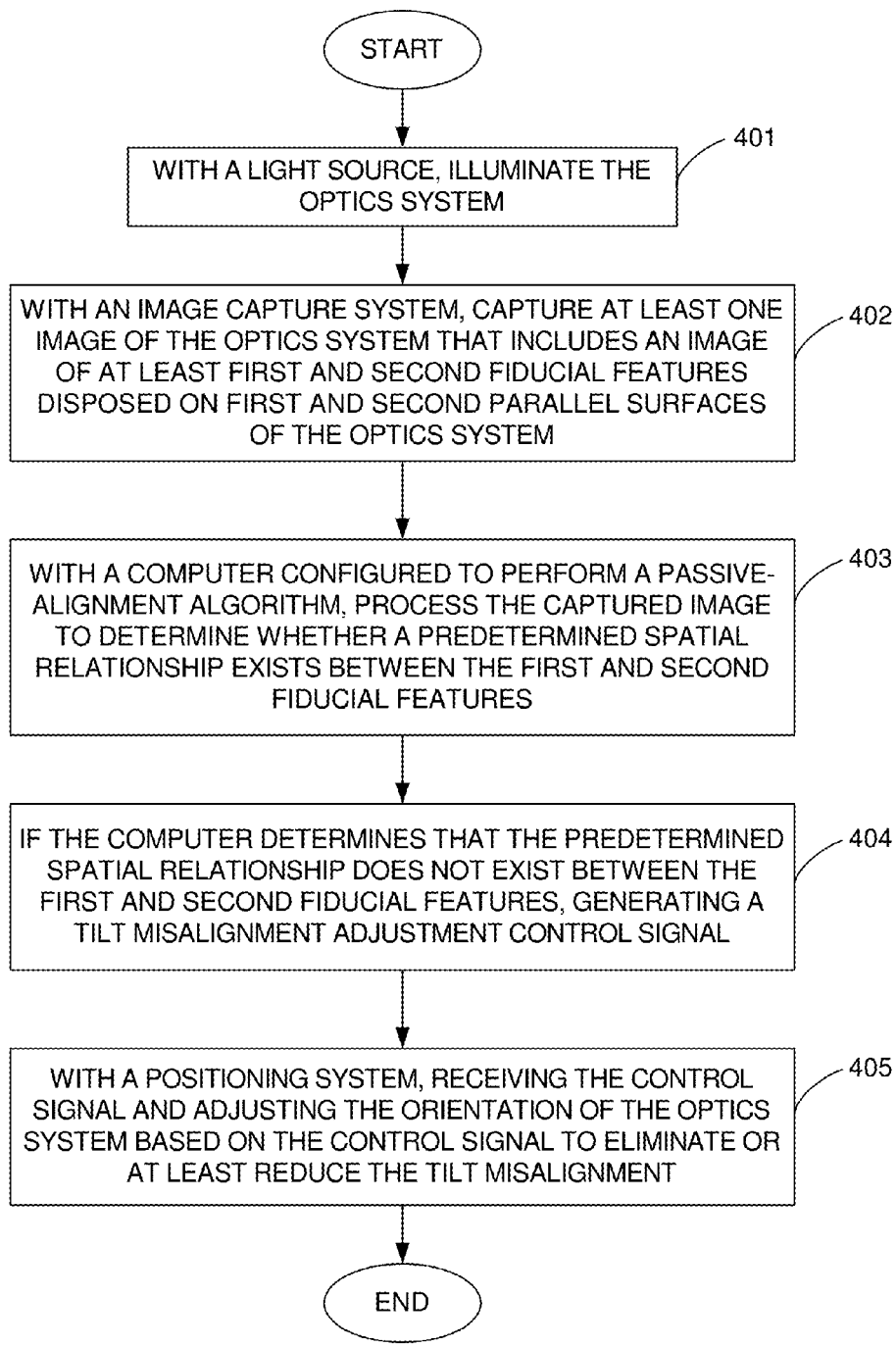
FIG. 11 illustrates a flowchart that represents the method in accordance with an illustrative embodiment.

FIG. 11 illustrates a flowchart that represents the method in accordance with an illustrative embodiment. With one or more light sources, the optics system is illuminated, as indicated by block 401. One or more dedicated light sources may be used for this purpose or an existing light source in the environment that provides suitable illumination may be used for this purpose. An image capture system is then used to capture at least one image of the optics system, as indicated by block 402. The captured image includes an image of at least the first and second fiducial features disposed on first and second substantially parallel surfaces of the optics system. In the example shown in FIGS. 3 and 6, only two fiducial features are used, whereas in the examples shown in FIGS. 7 and 9 three or four fiducial features are used, respectively. In each of these examples, at least one fiducial feature is disposed on a first surface of the optics system and at least one other fiducial feature is disposed on a second surface of the optics system, where the first and second surfaces are substantially parallel to one another.

A computer that is configured to perform the passive-alignment algorithm processes the captured image to determine whether or not a predetermined spatial relationship exists between the fiducial features, as indicated by block 403. The predetermined spatial relationship corresponds to the spatial relationship that exists when the first and second surfaces are parallel to the X-Y plane, and therefore parallel to the plane in which the upper surface of the circuit board lies. As indicated above with reference to the embodiments of FIGS. 3, 6, 7, and 9, the predetermined spatial relationship will differ depending on the number and locations of the fiducial features that are used for this purpose. If the computer determines that the predetermined spatial relationship does not exist, then the computer causes a control signal to be generated corresponding to a tilt misalignment adjustment that will be made to the orientation of the optics system to eliminate the tilt misalignment, as indicated by block 404. The positioning system receives the control signal and adjusts the orientation of the optics system based on the control signal in order to eliminate, or at least reduce, the tilt misalignment, as indicated by block 405.

Figure 12:
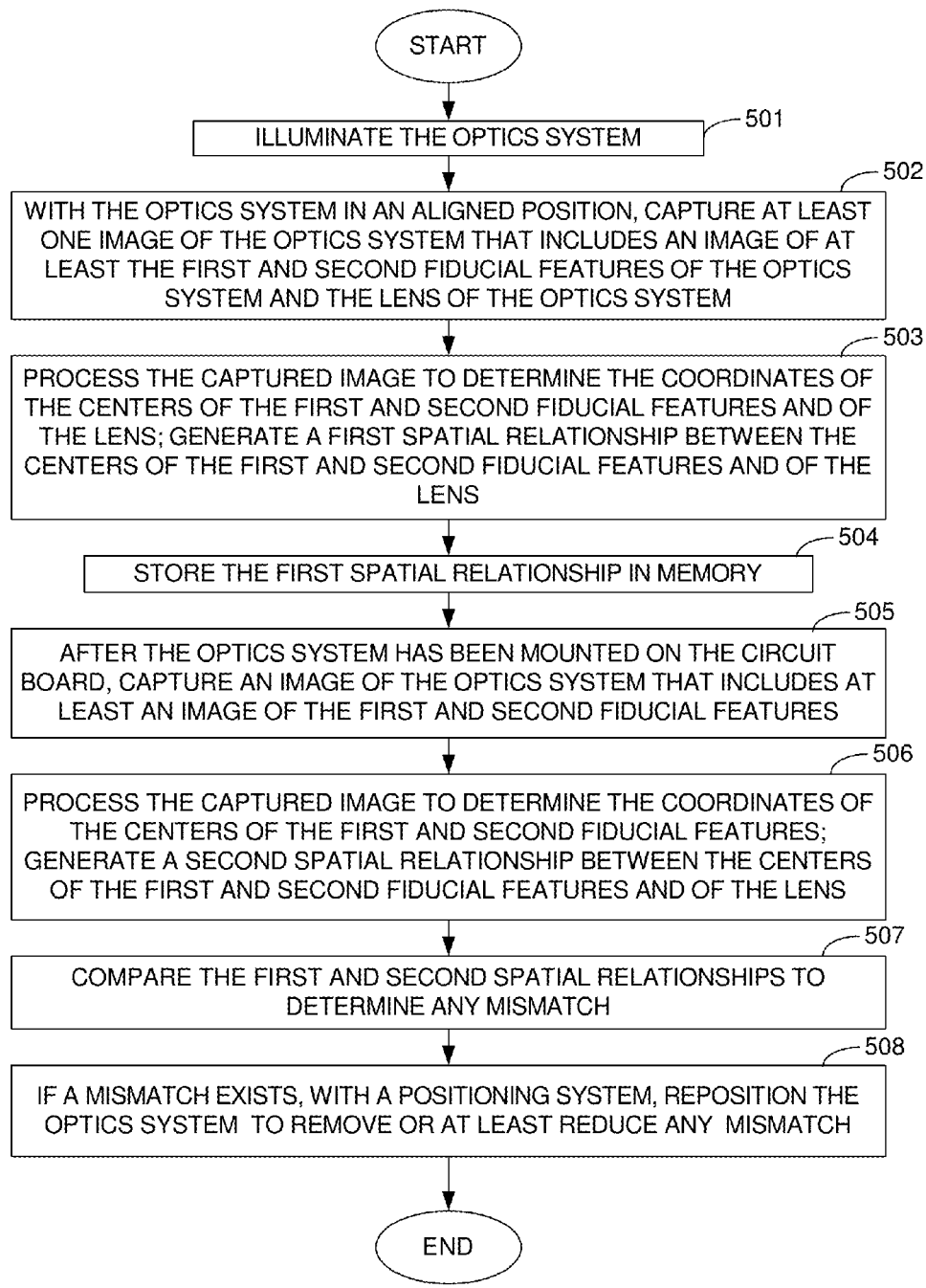
FIG. 12 illustrates a flowchart that represents the method in accordance with another illustrative embodiment.

FIG. 12 illustrates a flowchart that represents the passive-alignment algorithm that includes the aforementioned mapping algorithm. With one or more light sources, the optics system is illuminated, as indicated by block 501. An image capture system is then used to capture at least one image of the optics system at a time prior to the optics system being mounted on the circuit board and at a time when there is no tilt misalignment, as indicated by block 502. In order to capture this image at the proper instant in time, the process described above with reference to FIG. 11 may be used to place the optics system in an aligned orientation in which the first and second substantially parallel surfaces of the optics system are parallel to the X-Y plane. It should be noted, however, that the process represented by the flowchart of FIG. 12 may be used as the sole process for performing passive alignment, i.e., instead of performing the passive alignment process represented by the flowchart of FIG. 11.

The image that is captured at the step represented by block 502 is captured before the circuit board has been moved into a position that occludes the view of the upward-looking camera to the optics system. The captured image is a composite image that includes an image of at least the first and second fiducial features disposed on first and second substantially parallel surfaces of the optics system and an image of the lens disposed on the lower surface of the optics system. The second surface may or may not be the lower surface of the circuit board.

A computer that is configured to perform the passive-alignment algorithm processes the captured image to determine the coordinates of the centers of the fiducial features and of the lens and to generate a first spatial relationship among centers of the fiducial features and the lens, as indicated by block 503. The computer stores the first spatial relationship in a memory device, as indicated by block 504. After the optics system has been mounted on the circuit board, the image capture system captures at least one image of the optics system, as indicated by block 505. The captured image includes an image of at least the first and second fiducial features. The computer processes the captured image to determine the coordinates of the centers of the fiducial features and to generate a second spatial relationship among the centers of the fiducial features and the lens, as indicated by block 506. The computer then compares the first spatial relationship with the second spatial relationship to determine whether there is any mismatch, as indicated by block 507. If any mismatch exists, the computer then causes the positioning system to reposition the optics system on the circuit board to remove, or at least reduce, the mismatch, as indicated by block 508. The processes represented by blocks 505 through 508 may be repeatedly performed until a determination is made that the first and second spatial relationships match one another.

It should be noted that the invention has been described with reference to illustrative, or exemplary, embodiments for the purpose of describing the principles and concepts of the invention. The invention is not limited to the illustrative embodiments described herein, as will be understood to those skilled in the art in view the description provided herein. For example, the invention is not limited with respect to the optics system that the invention is used to mount or with respect to the circuit board on which the optics system is mounted. Also, the invention is not limited with respect to the components that are used in the vision-aided passive alignment system. The system 100 shown in FIG. 4 is merely one example of a suitable configuration for the vision-aided passive alignment system. Those skilled in the art will understand that these and other modifications may be made to the embodiments described herein, and that all such modifications are within the scope of the invention.

What is claimed is:

1. A method for performing vision-aided passive alignment during a mounting process, the method comprising:

with a light source, illuminating an optics system with light;

with an image capture system, capturing at least one image of the optics system, wherein the optics system has a first fiducial feature disposed on an upper surface and a second fiducial feature disposed on a lower surface;

using said at least one image to identify at least one of a first spatial relationship that exists between the first and second fiducial features when the lower surface of the optics system lies in a plane that is parallel to an X-Y plane of an X, Y, Z Cartesian coordinate system or a second spatial relationship that exists between the first and second fiducial features when the lower surface of the optics system lies in a plane that is not parallel to the X-Y plane of the Cartesian coordinate system;

with a computer performing a passive-alignment algorithm to generate, when the second spatial relationship exists, at least one control signal corresponding to a tilt misalignment adjustment; and with a positioning system, receiving said at least one control signal and adjusting an orientation of the optics system based on said at least one control signal to eliminate or at least reduce a tilt misalignment of the optics system relative to a mounting surface upon which the optics system is mounted.

2. The method of claim 1, wherein the first fiducial feature is a transparent circular window formed on the upper surface of the optics system, and wherein the second fiducial feature is a darkened circular feature formed on the lower surface of the optics system, and wherein performing the passive-alignment algorithm comprises comparing the at least one of the first spatial relationship or the second spatial relationship with a predetermined spatial relationship, and wherein said predetermined spatial relationship corresponds to a coaxial alignment of a center of the darkened circular feature with a center of the transparent circular window along an imaginary line that is parallel to the Z-axis when the lower surface of the optics system is parallel to the X-Y plane of the Cartesian coordinate system.

3. The method of claim 2, wherein the passive-alignment algorithm includes an edge-detection algorithm that detects edges of each of the transparent circular window and the darkened circular feature, and determines therefrom, X, Y and Z coordinates of each of the respective center of the transparent circular window and the darkened circular feature.

4. The method of claim 2, wherein the transparent circular window appears lighter than the darkened circular feature in the at least one image captured by the image capture system.

5. The method of claim 1, wherein at least a third fiducial feature is disposed on the upper surface of the optics system, and wherein said at least one image includes an image of the first, second and third fiducial features, and wherein a predetermined spatial relationship exists between the first, second and third fiducial features when the lower surface of the optics system lies in a plane that is parallel to an X-Y plane of the X, Y, Z Cartesian coordinate system, and wherein a third spatial relationship that is other than said predetermined spatial relationship exists between the first, second and third fiducial features when the lower surface of the optics system lies in a plane that is not parallel to the X-Y plane of the Cartesian coordinate system.

6. The method of claim 1, wherein the image capture system captures multiple images of the optics system in real-time as the positioning system moves the optics system toward the mounting surface, wherein each of said multiple images includes an image of the first and second fiducial features at a respective instant in time when the respective image was captured, and wherein the computer that performs the passive alignment algorithm processes each captured image to determine whether or not to generate at least one respective control signal corresponding to a tilt misalignment adjustment, and wherein the positioning system receives each control signal in real-time and adjusts an orientation of the optics system based on the respective control signal to eliminate or at least reduce a tilt misalignment of the optics system relative to the mounting surface.

7. The method of claim 1, wherein the image capture system comprises:

a downward-looking camera that is positioned above the optics system looking down on the optics system such that the upper surface of the optics system is disposed in between the downward-looking camera and the lower surface of the optics system; and an upward-looking camera that is positioned below the optics system looking up at the optics system such that the lower surface of the optics system is disposed in between the first upper surface of the optics system and the upward-looking camera.

8. A vision-aided passive alignment system comprising:

a light source that illuminates an optics system with light;

an image capture system that captures at least one image of the optics system, wherein the optics system has a first fiducial feature disposed on a first surface and a second fiducial feature disposed on an opposing second surface;

a computer configured to process said at least one image to identify at least one of a first spatial relationship that exists between the first and second fiducial features when the lower surface of the optics system lies in a plane that is parallel to an X-Y plane of an X, Y, Z Cartesian coordinate system or a second spatial relationship that exists between the first and second fiducial features when the lower surface of the optics system lies in a plane that is not parallel to the X-Y plane of the Cartesian coordinate system, the computer further configured to perform a passive-alignment algorithm to generate, when the second spatial relationship exists, at least one control signal corresponding to a tilt misalignment adjustment; and a positioning system that receives said at least one control signal and adjusts an orientation of the optics system based on said at least one control signal to eliminate or at least reduce a tilt misalignment of the optics system relative to a mounting surface upon which the optics system is to be mounted.

9. The vision-aided passive alignment system of claim 8, wherein the first fiducial feature is a transparent circular window formed on the first surface of the optics system, and wherein the second fiducial feature is a darkened circular feature formed on the second surface of the optics system, and wherein performing the passive-alignment algorithm comprises the computer comparing the at least one of the first spatial relationship or the second spatial relationship with a predetermined spatial relationship, and wherein said predetermined spatial relationship corresponds to a coaxial alignment of a center of the darkened circular feature with a center of the transparent circular window along an imaginary line that is parallel to the Z axis when the second surface of the optics system is parallel to the X-Y plane of the Cartesian coordinate system.

10. The vision-aided passive alignment system of claim 9, wherein the passive-alignment algorithm includes an edge-detection algorithm that determines a respective diameter of each of the transparent circular window and the darkened circular feature, and determines therefrom, X, Y and Z coordinates of each of the respective center of the transparent circular window and the darkened circular feature.

11. The method of claim 9, wherein the darkened circular feature is configured to at least one of a) absorb the light emitted by the light source or b) reflect the light emitted by the light source, and wherein the transparent circular window appears lighter than the darkened circular feature in the at least one image captured by the image capture system when the darkened circular feature is made visible to the image capture system through the transparent circular window.

12. The vision-aided passive alignment system of claim 8, wherein at least a third fiducial features is disposed on the first surface of the optics system, and wherein said at least one image includes an image of the first, second and third fiducial features, and wherein a predetermined spatial relationship exists between the first, second and third circular features when the second surface of the optics system lies in a plane that is parallel to an X-Y plane of the X, Y, Z Cartesian coordinate system, and wherein a third spatial relationship that is other than said predetermined spatial relationship exists between the first, second and third fiducial features when the second surface of the optics system lies in a plane that is not parallel to the X-Y plane of the Cartesian coordinate system.

13. The vision-aided passive alignment system of claim 8, wherein the image capture system captures multiple images of the optics system in real-time as the positioning system moves the optics system toward the mounting surface, wherein each of said multiple images includes an image of the first and second fiducial features at a respective instant in time when the respective image was captured, and wherein the computer that performs the passive-alignment algorithm processes each captured image to determine whether or not to generate at least one respective control signal corresponding to a tilt misalignment adjustment, and wherein the positioning system receives each control signal in real-time and adjusts an orientation of the optics system based on the respective control signal to eliminate or at least reduce a tilt misalignment of the optics system relative to the mounting surface.

14. The vision-aided passive alignment system of claim 8, wherein the image capture system comprises:
  a downward-looking camera that is positioned above the optics system looking down on the optics system such that the first surface of the optics system is disposed in between the downward-looking camera and the second surface of the optics system; and
  an upward-looking camera that is positioned below the optics system looking up at the optics system such that the second surface of the optics system is disposed in between the first surface of the optics system and the upward-looking camera.

15. A computer program for performing a vision-aided passive alignment algorithm during a mounting process, the algorithm comprising computer code for execution by a computer, the code being stored on a non-transitory computer-readable medium, the computer program comprising:
  a first computer code segment for processing at least one image of an optics system, wherein the optics system includes a first fiducial feature disposed on a first surface and a second fiducial feature disposed on an opposing second surface, the processing comprising using the at least one image to identify at least one of a first spatial relationship that exists between the first and the second fiducial features when the second surface of the optical system lies in a plane that is parallel to an X-Y plane of an X, Y, Z Cartesian coordinate system or a second spatial relationship that exists between the first and the second fiducial features when the second surface of the optical system lies in a plane that is not parallel to the X-Y plane of the Cartesian coordinate system; and
  a second computer code segment for generating, when the second spatial relationship exists, at least one control signal corresponding to a tilt misalignment adjustment, said at least one control signal being delivered to a positioning system to cause the positioning system to adjust an orientation of the optics system based on said at least one control signal to eliminate or at least reduce a tilt misalignment of the optics system relative to a mounting surface upon which the optics system is mounted.

16. The computer program of claim 15, wherein the first fiducial feature is a transparent circular window formed on the first surface of the optics system, and wherein the second fiducial feature is a darkened circular feature formed on the second surface of the optics system, and wherein the first computer code segment compares the at least one of the first spatial relationship or the second spatial relationship with a predetermined spatial relationship to identify at the least one of the first or the second spatial relationship, and wherein said predetermined spatial relationship corresponds to a coaxial alignment of a center of the darkened circular feature with a center of the transparent circular window along an imaginary line that is parallel to the Z-axis when the second surface of the optics system is parallel to the X-Y plane of the Cartesian coordinate system.

17. The computer program of claim 16, wherein the passive-alignment algorithm includes an edge-detection algorithm that detects edges of each of the transparent circular window and the darkened circular feature for determining X, Y and Z coordinates of each of the respective center of the transparent circular window and the darkened circular feature.

18. The computer program of claim 16, wherein the darkened circular feature is configured to absorb the light emitted by the light source, and wherein the transparent circular window appears lighter than the darkened circular feature in the at least one image captured by the image capture system when the darkened circular feature is made visible to the image capture system through the transparent circular window.

19. The computer program of claim 15, wherein at least a third fiducial features is disposed on the first surface of the optics system, and wherein said at least one image includes an image of the first, second and third fiducial features, and wherein a predetermined spatial relationship exists between the first, second and third fiducial features when the lower surface of the optics system lies in a plane that is parallel to an X-Y plane of the X, Y, Z Cartesian coordinate system, and wherein a third spatial relationship that is other than said predetermined spatial relationship exists between the first, second and third fiducial features when the lower surface of the optics system lies in a plane that is not parallel to the X-Y plane of the Cartesian coordinate system.

20. The computer program of claim 15, wherein the image capture system captures multiple images of the optics system in real-time as the positioning system moves the optics system toward the mounting surface, wherein each of said multiple images includes an image of the first and second fiducial features at a respective instant in time when the respective image was captured, and wherein the first computer code segment processes each captured image to determine whether or not to generate at least one respective control signal corresponding to a tilt misalignment adjustment, and wherein the positioning system receives each control signal in real-time and adjusts an orientation of the optics system based on the respective control signal to eliminate or at least reduce a tilt misalignment of the optics system relative to the mounting surface.

21. A method for performing vision-aided passive alignment during a mounting process, the method comprising:
with a light source, illuminating an optics system with light;
with an image capture system, capturing at least a first image of the optics system while the optics system is in an aligned orientation, wherein the optics system comprises a first fiducial feature disposed on an upper surface, a second fiducial feature disposed on a lower surface, and a lens disposed on the lower surface;
with a computer, processing the first image to determine X, Y and Z coordinates of centers of the fiducial features and of the lens, generating a first spatial relationship between the centers of the fiducial features and of the lens, and storing the first spatial relationship in a memory device;
with the computer, sending first control signals to a positioning system;
with a positioning system, receiving the first control signals and imparting motion to the optics system in accordance with the first control signals to cause the optics system to be mounted on a mounting surface;
with the image capture system, capturing at least a second image of the optics system after the optics system has been mounted on the upper surface of the circuit board, the second image including at least an image of the first and second fiducial features;
with the computer, processing the second image to determine X, Y and Z coordinates of centers of the fiducial features, generating a second spatial relationship between the centers of the fiducial features, and comparing the first and second spatial relationships with one another to determine whether or not a mismatch exists between the first and second spatial relationships;
with the computer, if a mismatch is determined to exist, generating second control signals; and
with a positioning system, receiving the second control signals and imparting motion to the optics system in accordance with the second control signals to cause the optics system to be repositioned on the mounting surface to remove or at least reduce the mismatch.

22. The method of claim 21, further comprising:
after repositioning the optics system on the mounting surface, with the image capture system, capturing at least a third image of the optics system, the third image including at least an image of the first and second fiducial features;
with the computer, processing the third image to determine X, Y and Z coordinates of centers of the fiducial features, generating a third spatial relationship between the centers of the fiducial features, and comparing the first and third spatial relationships with one another to determine whether or not a mismatch exists between the first and third spatial relationships;
with the computer, if a mismatch is determined to exist, generating third control signals; and
with a positioning system, receiving the third control signals and imparting motion to the optics system in accordance with the third control signals to cause the optics system to be repositioned on the mounting surface to remove or at least reduce the mismatch.

23. The method of claim 22, wherein the first fiducial feature is a transparent circular window formed on the upper surface of the optics system, and wherein the second fiducial feature is a darkened circular feature formed on the lower surface of the optics system, and wherein said first spatial relationship corresponds to a coaxial alignment of a center of the darkened circular feature with a center of the transparent circular window along an imaginary line that is parallel to the Z-axis.

24. The method of claim 22, wherein the image capture system comprises:
a downward-looking camera that is positioned above the optics system looking down on the optics system such that the upper surface of the optics system is disposed in between the downward-looking camera and the lower surface of the optics system; and
an upward-looking camera that is positioned below the optics system looking up at the optics system such that the lower surface of the optics system is disposed in between the first upper surface of the optics system and the upward-looking camera.

25. A computer program for performing a vision-aided passive alignment algorithm during a mounting process the algorithm comprising computer code for execution by a computer, the code being stored on a non-transitory computer-readable medium, the computer program comprising:
a first code segment for receiving a first image captured by an image capture system while the optics system is in an aligned position, the first image comprising a representation of each of a first fiducial feature disposed on an upper surface of the optics system, a second fiducial feature disposed on a lower surface of the optics system, and a lens disposed on the lower surface of the optics system;
a second code segment for processing the first image to determine X, Y and Z coordinates of centers of the first and second fiducial features and of the lens;
a third code segment for generating a first spatial relationship between the centers of the first and second fiducial features and of the lens and for storing the first spatial relationship in a memory device;
a fourth code segment for sending first control signals to a positioning system to cause the positioning system to impart motion to the optics system in accordance with the first control signals to cause the optics system to be mounted on a mounting surface;
a fifth code segment for receiving a second image of the optics system captured by the image capture system after the optics system has been mounted on the mounting surface, the second image including at least an image of the first and second fiducial features;
a sixth code segment for processing the second image to determine X, Y and Z coordinates of centers of the first and second fiducial features and to generate a second spatial relationship between the centers of the first and second fiducial features;

a seventh code segment for comparing the first and second spatial relationships with one another to determine whether or not a mismatch exists between the first and second spatial relationships;

an eighth code segment for generating second control signals if a mismatch is determined to exist, the second control signals being used by a positioning system that imparts motion to the optics system in accordance with the second control signals to cause the optics system to be repositioned on the mounting surface to remove or at least reduce the mismatch.

* * * * *